US011691364B2

(12) United States Patent
Aguilar et al.

(10) Patent No.: US 11,691,364 B2
(45) Date of Patent: Jul. 4, 2023

(54) METHODS OF MANUFACTURING LIQUID LENSES

(71) Applicant: CORNING INCORPORATED, Corning, NY (US)

(72) Inventors: Alejandro Aguilar, Painted Post, NY (US); Tetyana Buchholz, Elmira, NY (US); Raymond Charles Cady, Horseheads, NY (US); Daniel Warren Hawtof, Corning, NY (US); Shawn Michael O'Malley, Horseheads, NY (US); Jason Daniel Steadman, Rochester, NY (US)

(73) Assignee: CORNING INCORPORATED, Corning, NY (US)

(*) Notice: Subject to any disclaimer, the term of this patent is extended or adjusted under 35 U.S.C. 154(b) by 395 days.

(21) Appl. No.: 17/056,561

(22) PCT Filed: May 22, 2019

(86) PCT No.: PCT/US2019/033426
§ 371 (c)(1),
(2) Date: Nov. 18, 2020

(87) PCT Pub. No.: WO2019/226721
PCT Pub. Date: Nov. 28, 2019

(65) Prior Publication Data
US 2021/0206128 A1 Jul. 8, 2021

Related U.S. Application Data

(60) Provisional application No. 62/674,926, filed on May 22, 2018.

(51) Int. Cl.
*B29D 11/00* (2006.01)
*G02B 26/00* (2006.01)

(52) U.S. Cl.
CPC ...... *B29D 11/00009* (2013.01); *G02B 26/005* (2013.01); *B29K 2995/0093* (2013.01)

(58) Field of Classification Search
CPC .................. B29D 11/00; G02B 26/005; B29K 2995/0093
See application file for complete search history.

(56) References Cited

U.S. PATENT DOCUMENTS

| 10,295,819 B1* | 5/2019 | Burger ..................... G01C 5/04 |
| 2005/0019952 A1 | 1/2005 | Moerman |

(Continued)

FOREIGN PATENT DOCUMENTS

| CN | 107797268 A | 3/2018 |
| JP | 2016-024464 A | 2/2016 |

(Continued)

OTHER PUBLICATIONS

International Search Report and Written Opinion of the International Searching Authority; PCT/US2019/033426; dated Aug. 20, 2019; 9 Pages; European Patent Office.

(Continued)

*Primary Examiner* — Mathieu D Vargot

(57) ABSTRACT

A method of forming a liquid lens, comprising the steps of: positioning a first substrate defining a hole over a second substrate, wherein a cavity is defined within the second substrate and aligned with the hole; dispensing a second liquid into the cavity defined within the second substrate; capping the second liquid with a first liquid dispensed through the hole, wherein the first liquid and the second liquid have different refractive indices than each other; and translating at least one of the first substrate and the second substrate such that the hole is not aligned with the cavity.

20 Claims, 11 Drawing Sheets

(56) References Cited

U.S. PATENT DOCUMENTS

| | | |
|---|---|---|
| 2006/0288761 A1 | 12/2006 | Kinnunen |
| 2008/0094725 A1 | 4/2008 | Weekamp |
| 2008/0097143 A1 | 4/2008 | Califorrniaa |
| 2009/0072037 A1* | 3/2009 | Good .................... G02B 7/08 |
| | | 235/462.35 |

FOREIGN PATENT DOCUMENTS

| | | |
|---|---|---|
| KR | 10-1559193 B1 | 10/2015 |
| WO | 2008/111035 A2 | 9/2008 |

OTHER PUBLICATIONS

Hou et al., "A full description of a scalable microfabrication process for arrayed elecliowetting microprisms", Journal of Micromechanics and Microengineering, vol. 20, No. 1, 2010, 015044.

* cited by examiner

METHODS OF MANUFACTURING LIQUID LENSES

REFERENCE TO RELATED APPLICATIONS

This application claims the benefit of priority under 35 U.S.C. § 371 of International Application No. PCT/US2019/033426, filed on May 22, 2019, which claims the benefit of U.S. Provisional Patent Application No. 62/674,926, filed May 22, 2018, which is incorporated by reference herein in its entirety.

FIELD OF THE DISCLOSURE

The disclosure relates to liquid lenses and, more particularly, to methods of manufacturing liquid lenses.

BACKGROUND

Liquid lenses generally include two immiscible liquids disposed within a cavity. Varying an electric field applied to the liquids can vary the wettability of one of the liquids relative to walls of the cavity, which has the effect of varying the shape of an interface (meniscus) formed between the two liquids. Further, in various applications, changes to the shape of the interface result in changes to the focal length of the lens. There is a problem in that previously considered ways of filling the cavity with the two liquids are too slow, require complex equipment, and/or result in one liquid displacing the other liquid outside of the cavity.

SUMMARY OF THE DISCLOSURE

The present disclosure solves that problem with a method of forming the liquid lens that dispenses a single drop of a requisite volume of one fluid onto the other fluid already in the cavity in a manner that caps, but not displaces, the other fluid already in the cavity. The single drop is centered over the liquid already in the cavity and released from a very short distance from the liquid already in the cavity. In an embodiment, the drop of liquid nearly simultaneously combines with a quantity of the same or similar liquid surrounding the cavity, forming a cap over the fluid already in the cavity and preventing displacement of that fluid already in the cavity to outside of the cavity. In an embodiment, one or more additional drops of the fluid is dispensed after the already dispensed drop caps the other fluid, in the event that additional volume of the dispensed fluid is required to fill the cavity.

According to a first aspect of the present disclosure, a method of forming a liquid lens, comprises the steps of: positioning a first substrate defining a hole over a second substrate, wherein a cavity is defined within the second substrate and aligned with the hole; dispensing a second liquid into the cavity defined within the second substrate; capping the second liquid with a first liquid dispensed through the hole, wherein the first liquid and the second liquid have different refractive indices than each other; and translating at least one of the first substrate and the second substrate such that the hole is not aligned with the cavity.

According to a second aspect, the method according to the first aspect, wherein the first substrate is a mask layer.

According to a third aspect, the method according to the first aspect, wherein the first substrate defines a first window and the second substrate defines a second window.

According to a fourth aspect, the method according to any of the first through third aspects, wherein the translating comprises translating the first substrate relative to the second substrate while maintaining the second substrate stationary.

According to a fifth aspect, the method according to any of the first through third aspects, wherein the translating comprises translating the second substrate relative to the first substrate while maintaining the first substrate stationary.

According to a sixth aspect, the method according to any of the first through fifth aspects, wherein the first liquid comprises a polar liquid.

According to a seventh aspect, the method according to any of the first through sixth aspects, wherein the second liquid comprises a non-polar liquid.

According to an eighth aspect, the method according to any of the first through seventh aspects, wherein the first substrate comprises a first outer layer; and the second substrate comprises an intermediate layer and a second outer layer bonded to the intermediate layer, a bore through the intermediate layer defining the cavity.

According to a ninth aspect, the method according to any of the first through eighth aspects, wherein, the cavity includes an insulating element that is hydrophobic, and after the second liquid is dispensed within the cavity, the second liquid contacts the insulating element.

According to a tenth aspect, the method according to any of the first through ninth aspects, wherein capping the second liquid with a first liquid dispensed through the hole includes dispensing the entirety of the first liquid that caps the second liquid in a single drop from a dispensing end of a dispenser.

According to an eleventh aspect, the method according to the tenth aspect, wherein, a central axis of the dispensing end of the dispenser is aligned with a central axis of the second liquid within the cavity as the first liquid is dispensed.

According to a twelfth aspect, the method according to any of the tenth or eleventh aspects, wherein, the drop of the first liquid is a predetermined volume.

According to a thirteenth aspect, the method according to any of the first through twelfth aspects, wherein, the first liquid dispensed contacts a surface of the first substrate defining the hole before contacting the second liquid.

According to a fourteenth aspect of the present disclosure, a method of forming a liquid lens, comprising the steps of: positioning a first substrate defining a hole over a second substrate, wherein a cavity is defined above the second substrate and aligned with the hole; dispensing a second liquid into the cavity defined above the second substrate; positioning a dispenser having a dispensing end over the second liquid; capping the second liquid with a first liquid dispensed through the hole, wherein the first liquid that caps the second liquid is dispensed in one drop from the dispensing end, wherein and the first liquid and the second liquid have different refractive indices than each other; and translating at least one of the first substrate and the second substrate such that the hole is not aligned with the cavity.

According to a fifteenth aspect, the method according to the fourteenth aspect, wherein the drop contains a predetermined volume of the first liquid.

According to a sixteenth aspect, the method according to any of the fourteenth through fifteenth aspects, wherein the dispensing end of the dispenser has an internal diameter of from about 150 μm to about 250 μm.

According to a seventeenth aspect, the method according to any of the fourteenth through sixteenth aspects, wherein the drop forms a sphere having a circumference that is less than a circumference of the hole.

According to an eighteenth aspect, the method according to any of the fourteenth through seventeenth aspects, wherein a central axis of the dispensing end aligns with a central axis of the second liquid.

According to a nineteenth aspect, the method according to any of the fourteenth through eighteenth aspects, wherein the drop dissociates from the dispensing end and contacts a surface of the first substrate that defines the hole before contacting the second liquid.

According to a twentieth aspect, the method according to any of the fourteenth through nineteenth aspects, wherein the translating comprises translating the second substrate relative to the first substrate while maintaining the first substrate stationary.

According to a twenty-first aspect, the method according to any of the fourteenth through twentieth aspects, wherein, the cavity includes an insulating element that is hydrophobic, and after the second liquid is dispensed within the cavity, the second liquid contacts the insulating element.

According to a twenty-second aspect, the method according to the fourteenth through twenty-first aspects, wherein the drop has a volume of from about 500 nanoliters to about 3.0 microliters of the first liquid.

According to a twenty-third aspect, the method according to any of the fourteenth through twenty-second aspects, wherein the second substrate has a plurality of cavities each holding the second liquid, the first substrate has a plurality of holes, each disposed over one of the plurality of cavities, and a plurality of dispensers each comprising a dispensing end are positioned over the second liquid in each of the plurality of cavities, and the first liquid is simultaneously dispensed from each of the plurality of dispensers.

According to a twenty-fourth aspect, the method according to any of the fourteenth through twenty-third aspects, wherein after the drop of the first liquid caps the second liquid, a subsequent drop of the first liquid is dispensed to add additional volume of the first liquid until a predetermined volume of the first liquid within the cavity has been achieved.

According to a twenty-fifth aspect, the method according to any of the fourteenth through twenty-fourth aspects, wherein a volumetric ratio of the second liquid to the first liquid is from about 0.4 to about 0.6 and a density of the first liquid and a density of the second liquid are substantially similar.

According to a twenty-sixth aspect of the present disclosure, a method of forming a liquid lens, comprises the steps of: positioning a first substrate defining a hole over a second substrate, wherein a cavity is defined within the second substrate and aligned with the hole and a gap extends between the first substrate and the second substrate and a polar fluid is disposed in the gap between the first substrate and the second substrate; dispensing a second liquid into the cavity defined above the second substrate; capping the second liquid with a first liquid dispensed through the hole, wherein the first liquid and the second liquid have different refractive indices than each other; and translating at least one of the first substrate and the second substrate such that the hole is not aligned with the cavity.

According to a twenty-seventh aspect, the method according to the twenty-sixth aspect, wherein the polar fluid and the first liquid have substantially the same composition.

According to a twenty-eighth aspect, the method according to the twenty-sixth or twenty-seventh aspects, wherein the first liquid that caps the second liquid is dispensed in one drop.

According to a twenty-ninth aspect, the method according to any of the twenty-sixth through twenty-eighth aspects, wherein the first liquid that is dispensed meets the polar fluid and forms a contiguous cap with the polar fluid over the second liquid.

According to a thirtieth aspect, the method according to any of the twenty-sixth through twenty-ninth aspects, further comprising the step of collapsing the gap such that the polar fluid in the gap is substantially evacuated.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1A:
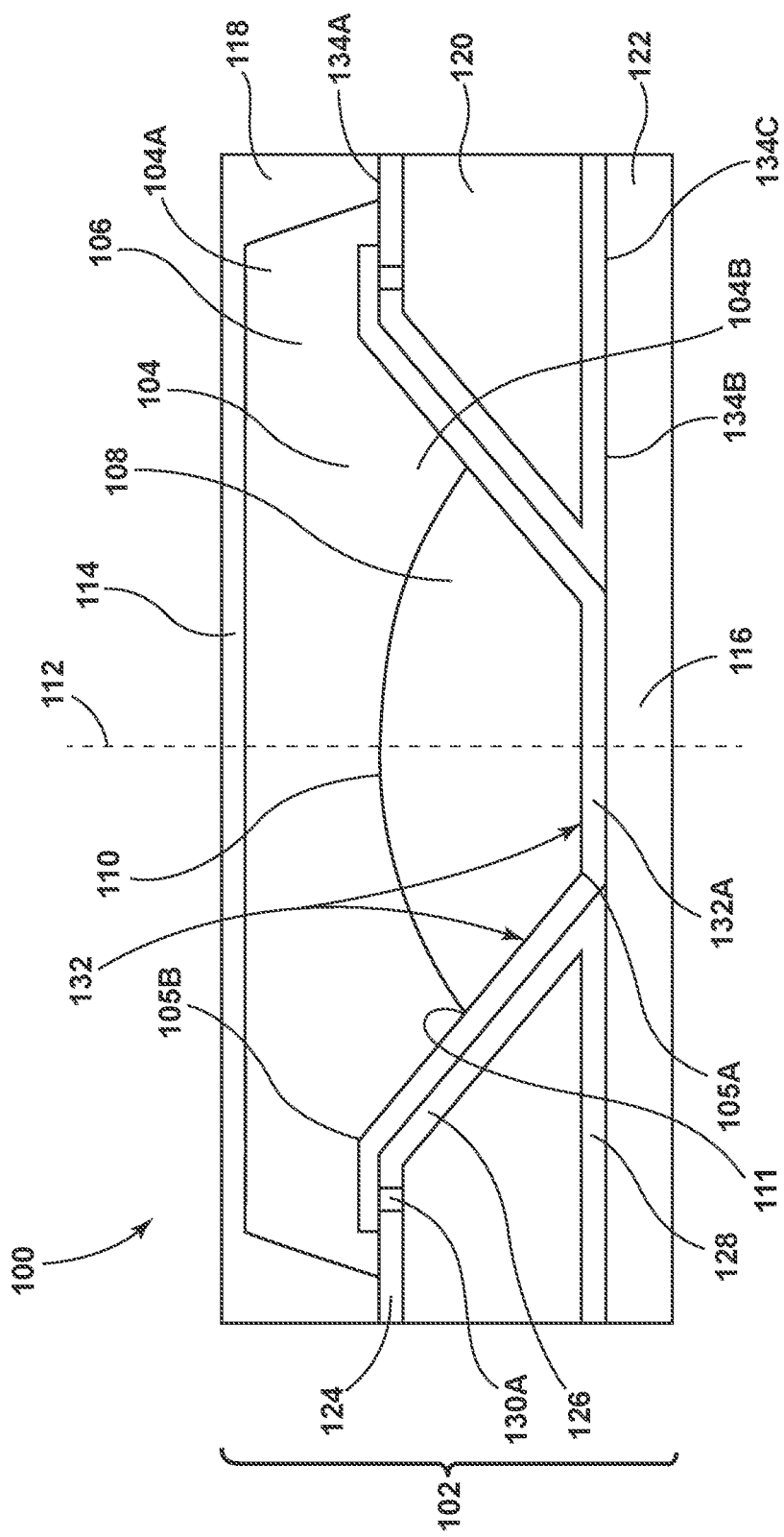
FIG. 1A is a schematic cross-sectional view of an embodiment of a liquid lens, illustrating a first liquid over a second liquid and forming an interface between them, and an insulating element in contact with the first liquid and the second liquid.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 1B:
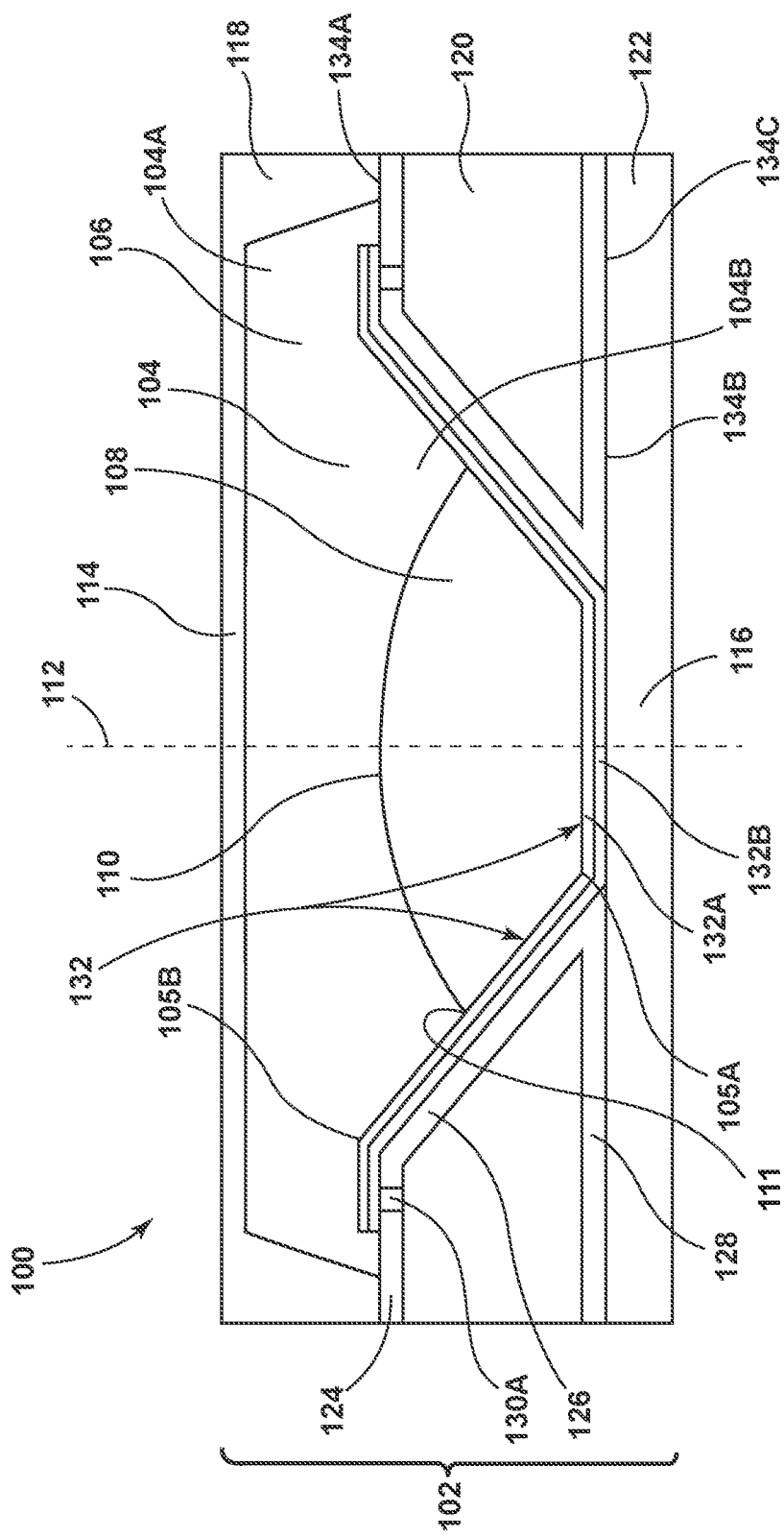
FIG. 1B is a schematic cross-sectional view of another embodiment of a liquid lens, illustrating an insulating element that includes an insulating outer layer and a base layer.
Figure 2:
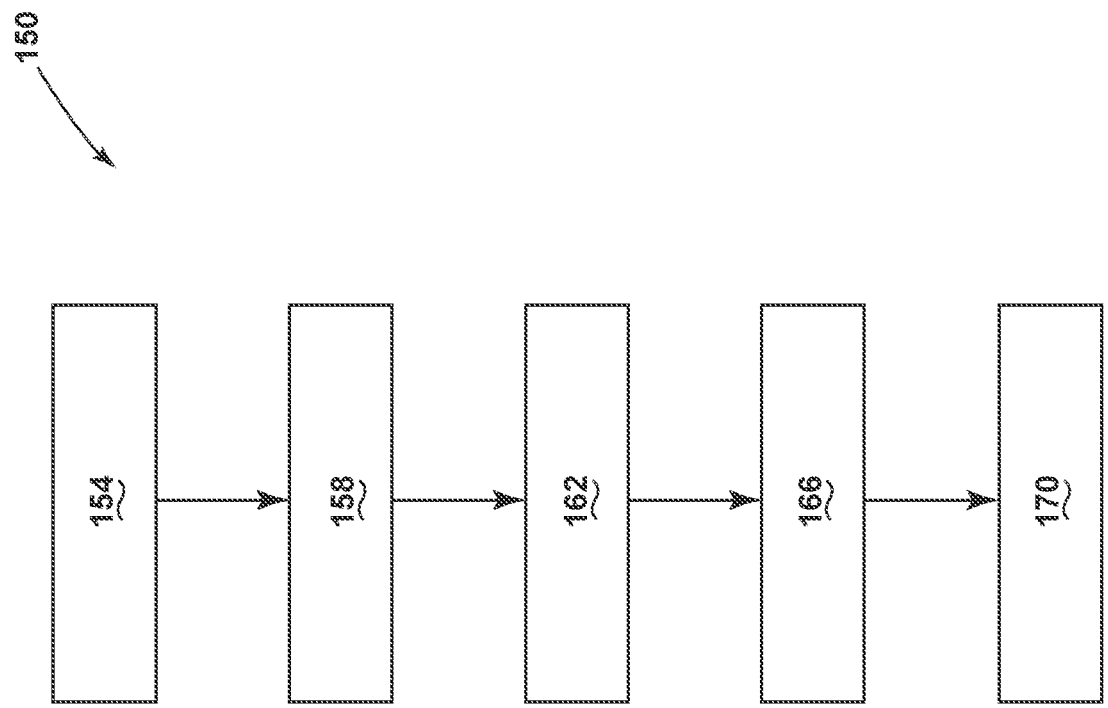
FIG. 2, is a schematic flowchart of a method of forming the liquid lens of either of FIGS. 1A and 1B, according to an embodiment.

Referring to FIGS. 1A and 1B, a liquid lens 100 that can be prepared according to the method described below includes a lens body 102 and a cavity 104 formed in the lens body 102. A first liquid 106 and a second liquid 108 are disposed within the cavity 104. The first liquid 106 may be a polar liquid or a conducting liquid. The second liquid 108 may be a non-polar liquid or an insulating liquid. The first liquid 106 and the second liquid 108 are immiscible with each other and have different refractive indices such that an interface 110 between the first liquid 106 and the second liquid 108 forms a variable lens. In some configurations, the first liquid 106 and the second liquid 108 have substantially the same density, which can help to avoid changes in the shape of the interface 110 as a result of changing the physical orientation of the liquid lens 100 (e.g., as a result of gravitational forces). According to other configurations, the densities of the first liquid 106 and the second liquid 108 are sufficiently different that separation or segmentation of the first liquid 106 and the second liquid 108 occurs due to the force of gravity and the passage of time, in the event the first liquid 106 and the second liquid 108 mix.

The first liquid 106 is generally a salt-containing aqueous liquid. The first liquid 106 can be water loaded with ionic compounds (such as one or more salts) that substantially or completely dissociate into cations and anions in the water. The water can be ultrapure water. Examples of anions include, but are not limited to, halides, e.g., chloride, bromide, iodide, sulfate, carbonate, hydrogen carbonate, acetate, and the like, as well as mixtures thereof. Examples of cations include, but are not limited to, alkali, alkaline-earth, and metallic cations. Examples of dissociable ionic compounds include, but are not limited to, potassium acetate, magnesium chloride, zinc bromide, lithium bromide, sodium bromide, lithium chloride, calcium chloride, sodium sulfate, and the like, as well as mixtures thereof. The first liquid 106 can be or can include an ionic liquid (i.e., an ionic compound that is liquid at temperatures relevant to the application of the liquid lens 100).

The first liquid 106 can include at least one conventional freezing-point lowering agent. Freezing-point lowering agents include, for example, alcohols, glycols, glycol ethers, polyols, polyetherpolyols, and the like, or mixtures thereof. Specific examples thereof include: ethanol, ethylene glycol (EG), monopropylene glycol (MPG or 1,2-propane-diol), 1,3-propane diol, 1,2,3-propane triol (glycerol), and the like, and mixtures thereof. The freezing-point lowering agent may decrease the freezing point of the first liquid 106 such that the first liquid 106 remains in the liquid state over a range of temperature comprised between about −20° C. and about +70° C.

The second liquid 108 is typically an oil, an alkane, or a blend of alkanes, including halogenated alkanes, or any other non-polar or insulating liquid that is not miscible with the first liquid 106. This non-conductive fluid comprises an organic or an inorganic (mineral) compound or mixture thereof. Examples of such organic or inorganic compounds include a Si-based monomer or oligomer, a Ge-based monomer or oligomer, a Si—Ge-based monomer or oligomer, a hydrocarbon, or a mixture thereof. Specific hydrocarbons include, for example, a linear or branched alkane, such as decane ($C_{10}H_{22}$), dodecane ($C_{12}H_{24}$), squalane ($C_{30}H_{62}$), and the like; an alkane comprising one or more rings, such as tert-butylcyclohexane ($C_{10}H_{20}$), and the like; a fused ring system, such as α-chloronaphthalene, α-bromonaphthalene, cis,trans-decahydronaphthalene ($C_{10}H_{18}$), and the like; a mixture of hydrocarbons, such as those available as Isopar® V, Isopar® P (from Exxon Mobil); and the like, and mixtures thereof. Specific examples of silicon based species include: hexamethyidisilane, diphenyldimethylsilane, chlorophenyltrimethylsilane, phenyltrimethyl-silane, phenethyltris(trimethylsiloxy)silane, phenyltris(trimethylsiloxy)silane, polydimethylsiloxane, tetra-phenyltetramethyltrisiloxane, poly(3,3,3-trifluoropropylmethylsiloxane), 3,5,7-triphenyl-nonamethyl-pentasiloxane, 3,5-diphenyloctamethyltetrasiloxane, 1,1,5,5-tetraphenyl-1,3,3,5-tetramethyl-trisiloxane, and hexamethylcyclotrisiloxane. Specific examples of germane based species include: hexamethyldigermane, diphenyldimethylgermane, and phenyltrimethylgermane. The first liquid 106 and the second liquid 108 can include anti-oxidant compounds such as the BHT-type (butylated hydroxytoluene) anti-oxidants, such as 2,6-di-tert-butyl-4-methylphenol.

In some embodiments, the cavity 104 includes a first portion, or headspace, 104A and a second portion, or base portion, 104B. For example, the second portion 104B of the cavity 104 may be defined by a bore in an intermediate layer 120 of the liquid lens 100 as described below. Additionally or alternatively, the first portion 104A of the cavity 104 is defined by a recess in a first outer layer 118 of the liquid lens 100 and/or disposed outside of the bore in the intermediate layer 120. In the illustrated embodiment, at least a portion of the first liquid 106 is disposed in the first portion 104A of the cavity 104, and the second liquid 108 is disposed within the second portion 104B of the cavity 104. Substantially all or a portion of the second liquid 108 is disposed within the second portion 104B of the cavity 104. A perimeter 111 of the interface 110 (e.g., an edge of the interface 110 in contact with a sidewall of the cavity 104) may be disposed within the second portion 104B of the cavity 104.

The interface 110 of the liquid lens 100 can be adjusted via electrowetting. For example, a voltage can be applied between the first liquid 106 and a surface of the cavity 104 (e.g., an electrode positioned near the surface of the cavity 104 and insulated from the first liquid 106 as described in greater detail below) to increase or decrease the wettability of the surface of the cavity 104 with respect to the first liquid 106 and change the shape of the interface 110. Adjusting of the interface 110 may change the shape of the interface 110, which in turn changes a focal length or focus of the liquid lens 100. For example, such a change of focal length can enable the liquid lens 100 to perform an autofocus function. Additionally or alternatively, adjusting the interface 110 may tilt the interface 110 relative to an optical axis 112 of the liquid lens 100. For example, such tilting of the interface 110 can enable the liquid lens 100 to perform an optical image stabilization (OIS) function. Adjusting the interface 110 can be achieved without physical movement of the liquid lens 100 relative to an image sensor, a fixed lens or lens stack, a housing, or other components of a camera module in which the liquid lens 100 can be incorporated.

The lens body 102 of the liquid lens 100 includes a first window 114 and a second window 116. The cavity 104 is disposed between the first window 114 and the second window 116. In the illustrated embodiment, the lens body 102 includes a plurality of layers that cooperatively form the lens body 102, such as a first outer layer 118, an intermediate layer 120, and a second outer layer 122. In this instance, the intermediate layer 120 defines a bore formed therethrough. The first outer layer 118 can be bonded to one side (e.g., an object side) of the intermediate layer 120. For example, the first outer layer 118 may be bonded to the intermediate layer 120 at a bond 134A. The bond 134A can be an adhesive bond, a laser bond (e.g., a laser weld), or another suitable coupling capable of maintaining the first liquid 106 and the second liquid 108 within the cavity 104. The second outer layer 122 can be bonded to an opposite side (e.g., an image side) of the intermediate layer 120. For example, the second outer layer 122 may be bonded to the intermediate layer 120 at a bond 134B and/or a bond 134C, each of which can be configured as described herein with respect to the bond 134A. The intermediate layer 120 is positioned between the first outer layer 118 and the second outer layer 122, with the bore of the intermediate layer 120 being covered on opposing sides by the first outer layer 118 and the second outer layer 122, and at least a portion of the cavity 104 is defined within the bore. Thus, a portion of the first outer layer 118 covering the cavity 104 serves as the first window 114, and a portion of the second outer layer 122 covering the cavity 104 serves as the second window 116.

As explained above, the cavity 104 can include the first portion 104A and the second portion 104B. In the depicted examples, the second portion 104B of the cavity 104 is defined by the bore in the intermediate layer 120, and the first portion 104A of the cavity 104 is disposed between the second portion 104B of the cavity 104 and the first window 114, but it will be understood that this configuration may be reversed. The first outer layer 118 includes a recess, and first portion 104A of the cavity 104 is disposed within the recess in the first outer layer 118. Thus, the first portion 104A of the cavity 104 is disposed outside of the bore in the intermediate layer 120.

As in the illustrated embodiment, the cavity 104 (e.g., the second portion 104B of the cavity 104) can be tapered such that a cross-sectional area of the cavity 104 decreases along the optical axis 112 in a direction from the object side to the image side of the liquid lens 100. For example, the second portion 104B of the cavity 104 includes a narrow end 105A and a wide end 105B. The terms "narrow" and "wide" are relative terms, meaning the narrow end 105A is narrower or thinner than the wide end 105B. Such a tapered example of the cavity 104 can help to maintain alignment of the interface 110 between the first liquid 106 and the second liquid 108 along the optical axis 112. In other examples, the cavity 104 is tapered such that the cross-sectional area of the cavity 104 increases along the optical axis 112 in the direction from the object side to the image side or non-tapered such that the cross-sectional area of the cavity 104 remains substantially constant along the optical axis 112.

In operation of the liquid lens 100, image light (or whatever range of wavelengths of electromagnetic radiation are intended to be manipulated) may enter the liquid lens 100 depicted in FIGS. 1A and 1B through the first window 114, be refracted at the interface 110 between the first liquid 106 and the second liquid 108, and exit the liquid lens 100 through the second window 116. The first window 114 and the second window 116 are sufficiently transparent to the wavelength of electromagnetic radiation intended to be manipulated via the interface 110, such as wavelengths within the visible and infrared spectrums. Accordingly, in some embodiments, the first outer layer 118 and/or the second outer layer 122 are sufficiently transparent to electromagnetic radiation in the visible spectrum to enable passage of image light. For example, the first outer layer 118 and/or the second outer layer 122 includes a polymeric material, a glass material, a ceramic material, a glass-ceramic material, other transparent materials, and/or combinations thereof. As in the illustrated embodiment, the outer surfaces of the first outer layer 118 and/or the second outer layer 122 can be substantially planar. Thus, although the liquid lens 100 can function as a lens (e.g., by refracting image light and/or other electromagnetic radiation passing through the interface 110), the outer surfaces of the liquid lens 100 can be flat as opposed to being curved like the outer surfaces of a fixed lens. However, in other embodiments of the liquid lens 100, the outer surfaces of the first outer layer 118 and/or the second outer layer 122 are curved (e.g., concave or convex). Thus, the liquid lens 100 may include an integrated fixed lens. The intermediate layer 120 may include a metallic material, a polymeric material, a glass material, a ceramic material, a glass-ceramic material, a composite material, and/or combinations thereof. As the image light can pass through the bore in the intermediate layer 120, the intermediate layer 120 may or may not be transparent to the image light.

It will be understood that although the lens body 102 of the liquid lens 100 is described as including the first outer layer 118, the intermediate layer 120, and the second outer layer 122, the construction of the liquid lens 100 may be different. For example, one or more of the first outer layer 118, the intermediate layer 120, and/or the second outer layer 122 may be omitted. Further, the bore in the intermediate layer 120 can be configured as a blind hole that does not extend entirely through the intermediate layer 120, and the second outer layer 122 can be omitted. Although the first portion 104A of the cavity 104 is described herein as being disposed within the recess in the first outer layer 118, other constructions are contemplated. For example, the recess may be omitted, and the first portion 104A of the cavity 104 is disposed within the bore in the intermediate layer 120. In such an example, the first portion 104A of the cavity 104 is an upper portion of the bore, and the second portion 104B of the cavity 104 is a lower portion of the bore. In other examples, the first portion 104A of the cavity 104 is disposed partially within the bore in the intermediate layer 120 and partially outside the bore.

The liquid lens 100 of the illustrated embodiment includes a common electrode 124 in electrical communication with the first liquid 106. The liquid lens 100 further includes a driving electrode 126 disposed on a sidewall of the cavity 104 and insulated from the first liquid 106 and the second liquid 108. Different voltages can be supplied to, or a voltage differential can be adjusted between, the common electrode 124 and the driving electrode 126 to change the shape of the interface 110.

The liquid lens 100 of the illustrated embodiment includes a conductive layer 128. At least a portion of the conductive layer 128 is disposed within the cavity 104. The conductive layer 128 includes a conductive coating applied to the intermediate layer 120 prior to bonding the first outer layer 118 and/or the second outer layer 122 to the intermediate layer 120. The conductive layer 128 can include a metallic material, a conductive polymer material, a conductive oxide, another suitable conductive material, and/or combinations thereof. The conductive layer 128 can include a single layer or a plurality of layers, some or all of which can be conductive. The conductive layer 128 can define both the common electrode 124 and the driving electrode 126. For example, the conductive layer 128 can be applied to substantially the entire outer surface of the intermediate layer 120 before bonding the first outer layer 118 and/or the second outer layer 122 to the intermediate layer 120. Following application of the conductive layer 128 to the intermediate layer 120, the conductive layer 128 can be segmented into various conductive elements (e.g., the common electrode 124, the driving electrode 126, etc.). The liquid lens 100 can include a scribe 130A in the conductive layer 128 to isolate (e.g., electrically isolate) the common electrode 124 and the driving electrode 126 from each other. The scribe 130A includes a gap in the conductive layer 128.

In the illustrated embodiment, the liquid lens 100 includes an insulating element 132 disposed within the cavity 104. The insulating element 132 can include an insulating coating applied to the intermediate layer 120 before bonding the first outer layer 118 and/or the second outer layer 122 to the intermediate layer 120. The insulating element 132 may include an insulating coating applied to the conductive layer 128 and the second window 116 after bonding the second outer layer 122 to the intermediate layer 120 and before bonding the first outer layer 118 to the intermediate layer 120. Thus, the insulating element 132 covers at least a portion of the conductive layer 128 within the cavity 104 and the second window 116. The insulating element 132 is sufficiently transparent to the wavelength of electromagnetic radiation intended to be manipulated via the interface 110, such as wavelengths within the visible and infrared spectrums to enable passage of such electromagnetic radiation (such as the image light) through the second window 116 as described above.

In the illustrated embodiment, the insulating element 132 covers at least a portion of the driving electrode 126 (e.g., the portion of the driving electrode 126 disposed within the cavity 104) to insulate the first liquid 106 and the second liquid 108 from the driving electrode 126. At least a portion of the common electrode 124 may be disposed within the cavity 104 and is uncovered by the insulating element 132. Thus, the common electrode 124 can be in electrical communication with the first liquid 106. The insulating element 132 may include a hydrophobic surface layer of the second portion 104B of the cavity 104. Such a hydrophobic surface layer can help to maintain the second liquid 108 within the second portion 104B of the cavity 104 (e.g., by attraction between the non-polar second liquid 108 and the hydrophobic material) and/or enable the perimeter 111 of the interface 110 to move along the hydrophobic surface layer (e.g., by electrowetting) to change the shape of the interface 110. The liquid lens 100, based at least in part on the insulating element 132, can exhibit a contact angle hysteresis (i.e., at the interface 110 between the first liquid 106 and the second liquid 108) of no more than 3°. As used herein, the "contact angle hysteresis" refers to the differential in measured contact angles of the second liquid 108 with the insulating element 132 upon a sequential application of a driving voltage to the driving electrode 126 (e.g., the differential between the driving voltage supplied to the driving electrode 126 and the common voltage supplied to the common electrode 124) from 0V to a maximum driving voltage, followed by a return to 0V (i.e., as relative to the common electrode 124). The initial contact angle, without voltage, is a maximum of 25° and increases to the contact angle, due to the electrowetting effect, of at least 15° at "the maximum driving voltage." The maximum driving voltage can be about 10V, or about 20V, or about 30V, or about 40V, or about 50V, or about 60V, or about 70V, or any and all values and ranges therebetween.

In the depicted example of FIG. 1A, the liquid lens 100 is configured such that the driving electrode 126 is disposed on a sidewall of the cavity 104 and insulated from the first liquid 106 and the second liquid 108 by the insulating element 132. The insulating element 132 includes an insulating outer layer 132A, as shown, that is in contact with the first liquid 106 and the second liquid 108. In the depicted example, the insulating element 132 is monolithic in the sense that the insulating outer layer 132A serves the dual function of being electrically insulating with regard to the first liquid 106 and the second liquid 108 and the driving electrode 126. The insulating element 132 may be hydrophobic (e.g., to resist wetting by the first liquid 106). Monolithic examples of the insulating element 132 may be advantageous from a processing and/or manufacturing standpoint. A thickness of the insulating outer layer 132A of the insulating element 132 may be from about 0.5 µm to about 10 µm, or from about 1 µm to about 10 µm, or from about 1 µm to about 9 µm, or from about 1 µm to about 8 µm, or from about 1 µm to about 7 µm, or from about 1 µm to about 6 µm, or from about 1 µm to about 5 µm, or from about 1 µm to about 4 µm, or from about 1 µm to about 3 µm, or from about 1 µm to about 2 µm, and any and all values and ranges therebetween. In a specific example, the thickness of the insulating outer layer 132A of the liquid lens 100 is from about 0.5 microns to about 2 microns.

In the embodiment illustrated at FIG. 1B, the liquid lens 100 is configured such that the driving electrode 126 is disposed on a sidewall of the cavity 104 and insulated from the first liquid 106 and the second liquid 108 by the insulating element 132. As shown in FIG. 1B, the insulating element 132 includes the insulating outer layer 132A that is in contact with the first liquid 106 and the second liquid 108, and a base layer 132B between the insulating outer layer 132A and the driving electrode 126. The insulating element 132 may be a multi-layer stack that includes the insulating outer layer 132A and the base layer 132B. In FIG. 1B, the base layer 132B and the insulating outer layer 132A are electrically insulating with regard to the first liquid 106 and the second liquid 108 and the driving electrode 126. In addition, the insulating outer layer 132A may be hydrophobic.

The base layer 132B and/or the insulating outer layer 132A can include one or more of polytetrafluoroethylene (PTFE), parylene, porous organosilicate films comprising silsesquioxane, polyimide, fluorinated polyimide, SiLK® semiconductor dielectric resin (from Dow Chemical Company), fluorine-doped silicon oxides, fluorinated amorphous carbon thin films, silicone polymers, amorphous fluoropolymers (e.g., Teflon® from DuPont), poly (arylene ethers), fluorinated and non-fluorinated para-xylylene linear polymers (e.g., Parylene C), amorphous fluoropolymers (e.g., Cytop® from Asahi Glass Co.), Hyflon® (from Solvay), aromatic vinyl siloxane polymers (e.g., DVS-BCD from Dow Chemical), diamond-like carbon, polyethylene, polypropylene, fluoroethylene propylene polymer, polynaphthalene, silicone-like polymeric films ($SiO_xC_yH_z$), $SiO_2$, $Si_3N_4$, $BaTiO_3$, $HfO_2$, $HfSiO_4$, $ZrO_2$, $Ta_2O_5$, $TiO_2$, $BarSrTiO_3$, $SrTiO_3$, $Al_2O_3$, $La_2O_3$, $Y_2O_3$, insulating sol-gels (e.g., silicon alkoxides), and spin-on-glass (e.g., Accuglass® Honeywell, Inc.). In a preferred implementation, the base layer 132B includes a parylene material (e.g., Parylene C). According to various examples, the base layer 132B is hydrophobic.

A thickness of the insulating outer layer 132A of the insulating element 132 may be from about 0.01 µm to about 2 µm, or from about 0.01 µm to about 1.5 µm, or from about 0.01 µm to about 1 µm, or from about 0.05 µm to about 2 µm, or from about 0.05 µm to about 1 µm, or from about 0.05 µm to about 0.5 µm, or from about 0.05 µm to about 0.4 µm, or from about 0.1 µm to about 2 µm, or from about 0.1 µm to about 1.5 µm, or from about 0.1 µm to about 1 µm, or from about 0.1 µm to about 0.5 µm, or any and all values and ranges therebetween.

Referring now to FIGS. 2-5F, depicted is a flowchart and various embodiments of a method 150 of forming the liquid lens 100 and the components of the liquid lens 100, as well as pictures of the method 150 through the various steps.

The method 150 may begin with a step 154 of positioning a first substrate 174 (e.g., the first outer layer 118 or a plurality of first outer layers 118 for a plurality of liquid lenses 100 formed from the first substrate 174) defining a hole 190 over a second substrate 178 (e.g., the intermediate layer 120, the second outer layer 122, and/or a combination of the intermediate layer 120 and the second outer layer 122, or a plurality thereof for a plurality of liquid lenses 100 formed from the second substrate 178), wherein the cavity 104 is defined above a window (e.g., the second window 116 defined by a portion of the second substrate 178 as described herein) and aligned with the hole 190 of the first substrate 174. According to such examples, the first substrate 174, or a portion thereof, defines the first window 114, and the second substrate 178, or a portion thereof, defines the second window 116. According to other examples, the first substrate 174 may be a mask or mask layer, and the second substrate 178 includes the second outer layer 122, a portion thereof defining the second window 116. The mask may be composed of a glass, a glass-ceramic, a ceramic, a polymeric material, a metal, a composite material, and/or combinations thereof. According to various examples, the mask may be thinner, less dense, and/or weigh less than the first outer layer 118. Upon completion of one or more of the steps of the method 150, the mask or mask layer may be removed and replaced with the first outer layer 118.

As explained above, the first substrate 174 (e.g., the mask or the first outer layer 118) defines or comprises the hole 190. It will be understood that the first substrate 174 may define or comprise a plurality of holes 190 in a pattern or array. The hole 190 is defined through the first substrate 174 such that fluid and/or electrical communication across the first substrate 174 may be accomplished. As the first substrate 174 is positioned over the second substrate 178, the hole 190 may be aligned with the cavity 104. For purposes of this disclosure, aligned may mean that the hole 190 and the cavity 104 partially or entirely overlap, are in fluid communication or otherwise allow the first liquid 106 and/or the second liquid 108 to pass through the first substrate 174 and into the cavity 104.

In another embodiment, a gap 182 (FIG. 4A) may be defined between the first substrate 174 and the second substrate 178. The gap 182 may be defined by one or more spacers or inserts between the first substrate 174 and the second substrate 178, or may exist due to the shape, morphology or roughness of the first substrate 174 and/or the second substrate 178. The gap 182 may have a constant or a changing width as measured between inboard surfaces of the first substrate 174 and the second substrate 178. The width of any point of the gap 182 may range from about 10 μm to about 500 μm, or from about 10 μm to about 475 μm, or from about 10 μm to about 450 μm, or from about 10 μm to about 425 μm, or from about 10 μm to about 400 μm, or from about 10 μm to about 375 μm, or from about 10 μm to about 350 μm, or from about 10 μm to about 325 μm, or from about 10 μm to about 300 μm, or from about 10 μm to about 275 μm, or from about 10 μm to about 250 μm, or from about 10 μm to about 225 μm, or from about 10 μm to about 200 μm, or from about 10 μm to about 175 μm, or from about 10 μm to about 150 μm, or from about 10 μm to about 125 μm, or from about 10 μm to about 100 μm, or from about 100 μm to about 250 μm, or from about 25 μm to about 200 μm. For example, the width of any point of the gap 182 may be about 10 μm, or about 20 μm, or about 30 μm, or about 40 μm, or about 50 μm, or about 60 μm, or about 70 μm, or about 80 μm, or about 90 μm, or about 100 μm, or about 110 μm, or about 120 μm, or about 130 μm, or about 140 μm, or about 150 μm, or about 160 μm, or about 170 μm, or about 180 μm, or about 190 μm, or about 200 μm, or about 210 μm, or about 220 μm, or about 230 μm, or about 240 μm, or about 250 μm, or about 260 μm, or about 270 μm, or about 280 μm, or about 290 μm, or about 300 μm, or any and all ranges and values therebetween.

Figure 4A:
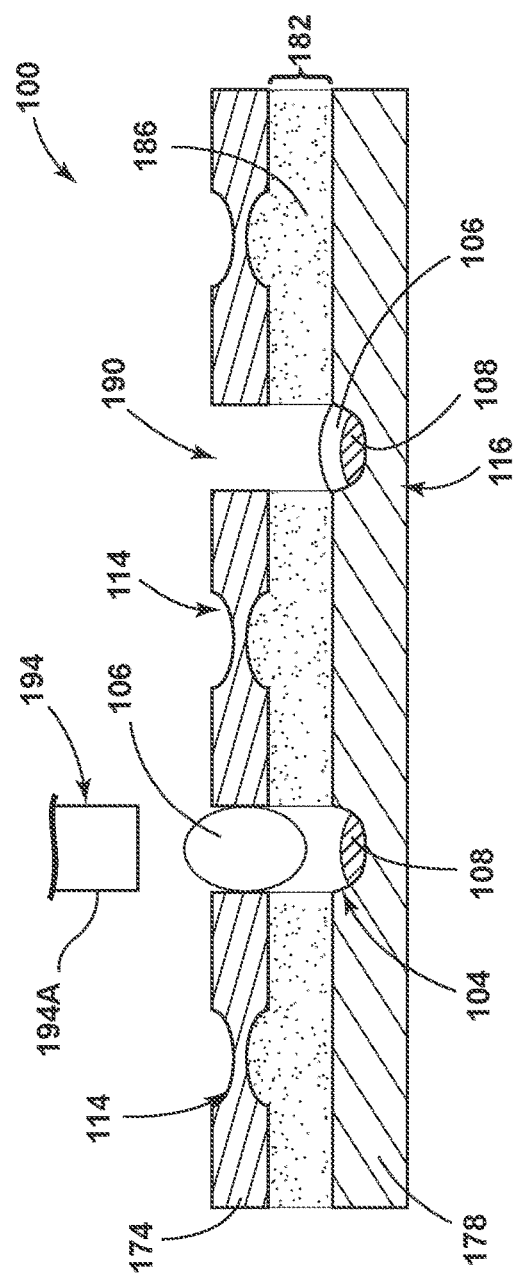
FIG. 4A is a schematic cross-section of another embodiment of a step of the method of FIG. 2, illustrating a gap between the first substrate and the second substrate that includes a polar fluid that can be the same as the first liquid, the first substrate including a plurality of holes aligned with the cavity, and a dispensing end of a dispenser dispensing a single drop of the first liquid through the hole, through the gap, and from a short distance above the second liquid within the cavity, with a cavity aligned with the hole.

According to various embodiments, the gap 182 (FIG. 4A) may be partially, substantially, or completely filled with a polar fluid 186 (FIG. 4A). For example, the method 150 can include introducing the polar fluid 186 into the gap 182 to partially, substantially, or completely fill the gap 182. The polar fluid 186 may have the same composition, substantially the same composition, or include one or more of the same constituents as the first liquid 106. In yet other embodiments, the polar fluid 186 may have a different composition than the first liquid 106. According to various embodiments, the polar fluid 186 positioned within the gap 182 may be in fluid communication with the first liquid 106 once the first liquid 106 is positioned in the cavity 104 over the second liquid 108 as described in greater detail below. Further, as the polar fluid 186 is positioned between the first substrate 174 and the second substrate 178, the polar fluid 186 may substantially surround the cavity 104 at the gap 182. For example, upon introducing the polar fluid 186 into the gap 182, the polar fluid 186 may flow between the first substrate 174 and the second substrate 178 (e.g., by capillary action) until the polar fluid 186 substantially surrounds an opening or mouth of the cavity 104. As the polar fluid 186 will essentially ring the circumference of the cavity 104, the polar fluid 186 may aid in retaining the second liquid 108 within the cavity 104. For example, the polar fluid 186 may form a barrier that substantially prevents the first liquid 106 from spontaneously exiting the cavity 104 (e.g., as a result of a repulsive force between the first liquid 106 and the insulating element 132) upon introducing the first liquid 106 into the cavity 104 as described herein.

Next, a step 158 of dispensing the second liquid 108 into the cavity 104 defined above or within the second substrate 178 is performed. The second liquid 108 may be poured, dispensed, or otherwise provided to the cavity 104 through the hole 190 in the first substrate 174. As the second liquid 108 may be a non-polar liquid, and the base layer 132B and/or the insulating outer layer 132A of the insulating element 132 may be composed of a hydrophobic material, the second liquid 108 may preferentially seat itself or remain in the lower portion of the cavity 104. Such a feature may be advantageous later in the method 150 in maintaining the second liquid 108 in place within the cavity 104 during subsequent steps of the method 150. For example, as polar embodiments of the first liquid 106 are positioned in the cavity 104, the tendency of the second liquid 108 to remain against the base layer 132B and/or the insulating outer layer 132A may retain the second liquid 108 in generally the orientation shown in FIGS. 1A and 1B.

Figure 5A:
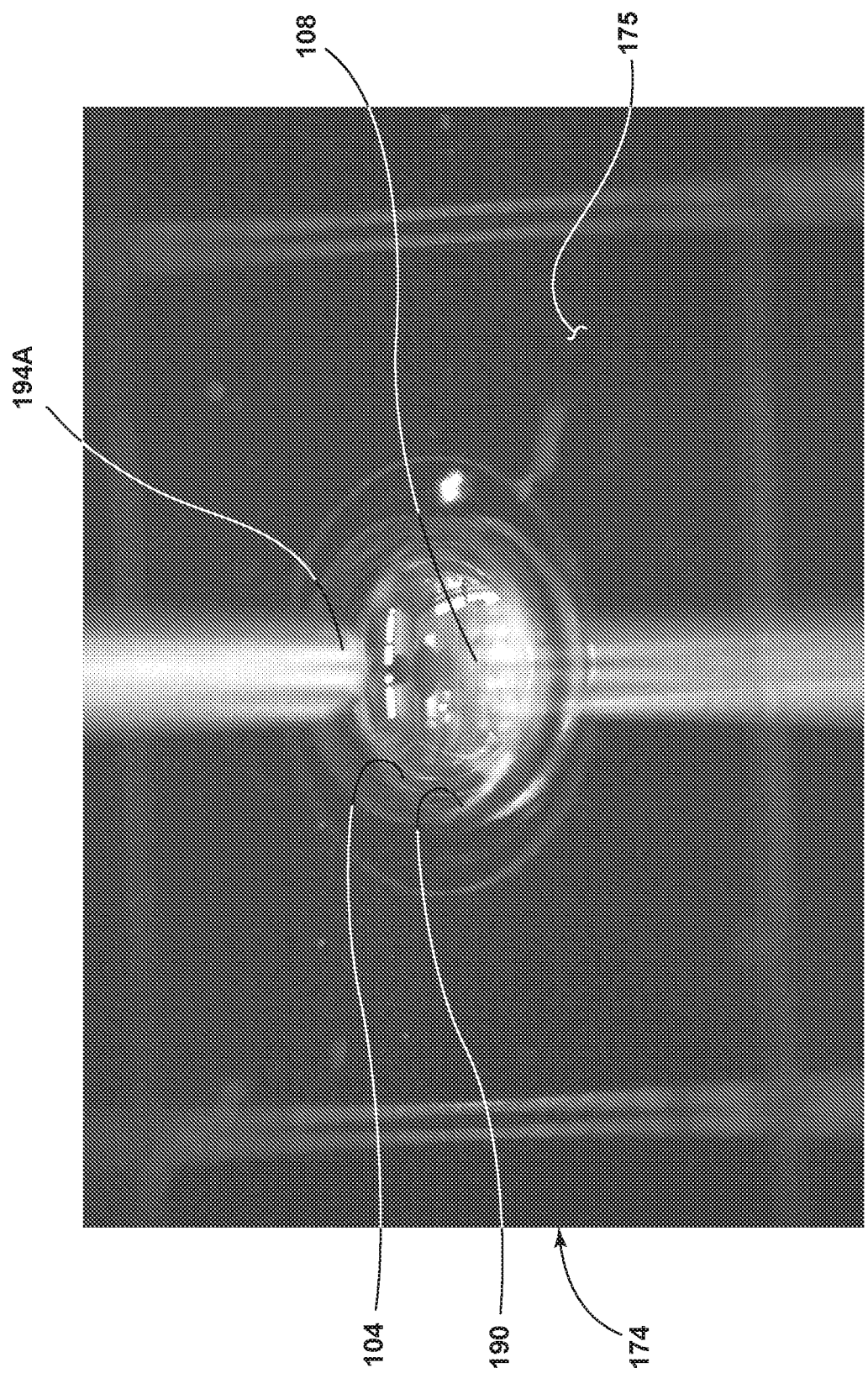
FIGS. 5A-5F are a series of pictures captured during the method of FIG. 2, illustrating a dispensing end of a dispenser for the first liquid centered over the second liquid already within the cavity (FIG. 5A), a drop of a predetermined volume of the first liquid beginning to form at the dispensing end (FIG. 5B), the drop of the predetermined volume of the first liquid fully formed (FIG. 5C), the first liquid just as the drop dissociates from the dispensing end and deforms (FIG. 5D), the first liquid capping the second liquid but with an air bubble within the cavity forcing the first liquid upward within the hole (FIG. 5E), and the first liquid capping the second liquid after the air bubble escapes from the cavity and the first liquid is able to drop below the hole (FIG. 5F).

Next, a step 162 of positioning a dispenser 194 having a dispensing end 194A over the second liquid 108 is performed. The dispenser 194 may be a tube, microfluidic device, nozzle, pipette, solenoid valve, syringe, other dispensing device, or combinations thereof. As will be explained in greater detail below, the dispenser 194 is configured to dispense the first liquid 106 in a single drop or possibly in a plurality of drops from the dispensing end 194A. It will be understood that a plurality of dispensers 194, each having a dispensing end 194A, may be positioned over the second liquid 108 in a plurality of cavities 104 and that one or more of the dispensing ends 194A may dispense the first liquid 106 as either a single drop or possibly in a plurality of drops. The picture of FIG. 5A shows the dispensing end 194A centered over the second liquid 108 within the cavity 104.

A center or central axis of the dispensing end 194A of the dispenser 194 may be aligned with a central axis (e.g., a direction perpendicular to an apex or vertex) of the second liquid 108 in the cavity 104, or the center of the dispensing end 194A may be slightly offset. The center of the dispensing end 194A may be offset from the central axis of the second liquid 108 from about 0 μm to about 100 μm, or from about 0 μm to about 90 μm, or from about 0 μm to about 80 μm, or from about 0 μm to about 70 μm, or from about 0 μm to about 60 μm, or from about 0 μm to about 50 μm, or from about 0 μm to about 40 μm, or from about 0 μm to about 30 μm, or from about 0 μm to about 20 μm, or from about 0 μm to about 10 μm, or any and all values and ranges therebetween. In a preferred embodiment, the central axis of the dispensing end 194A is aligned with the central axis of the second liquid 108 in the cavity 104 (at least approximately corresponding to the optical axis 112 of the liquid lens 100 being formed).

Figure 5B:
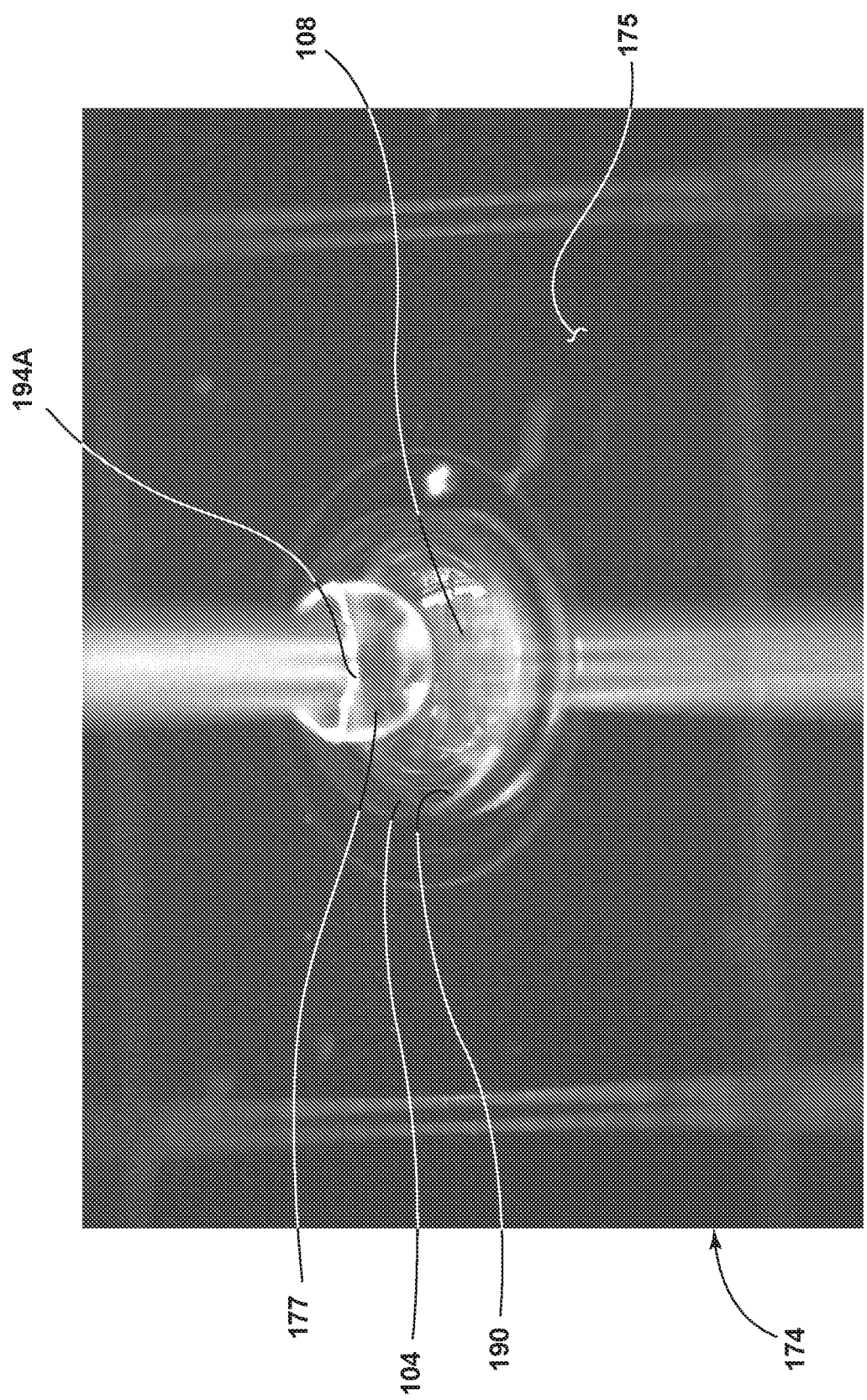
Figure 5C:
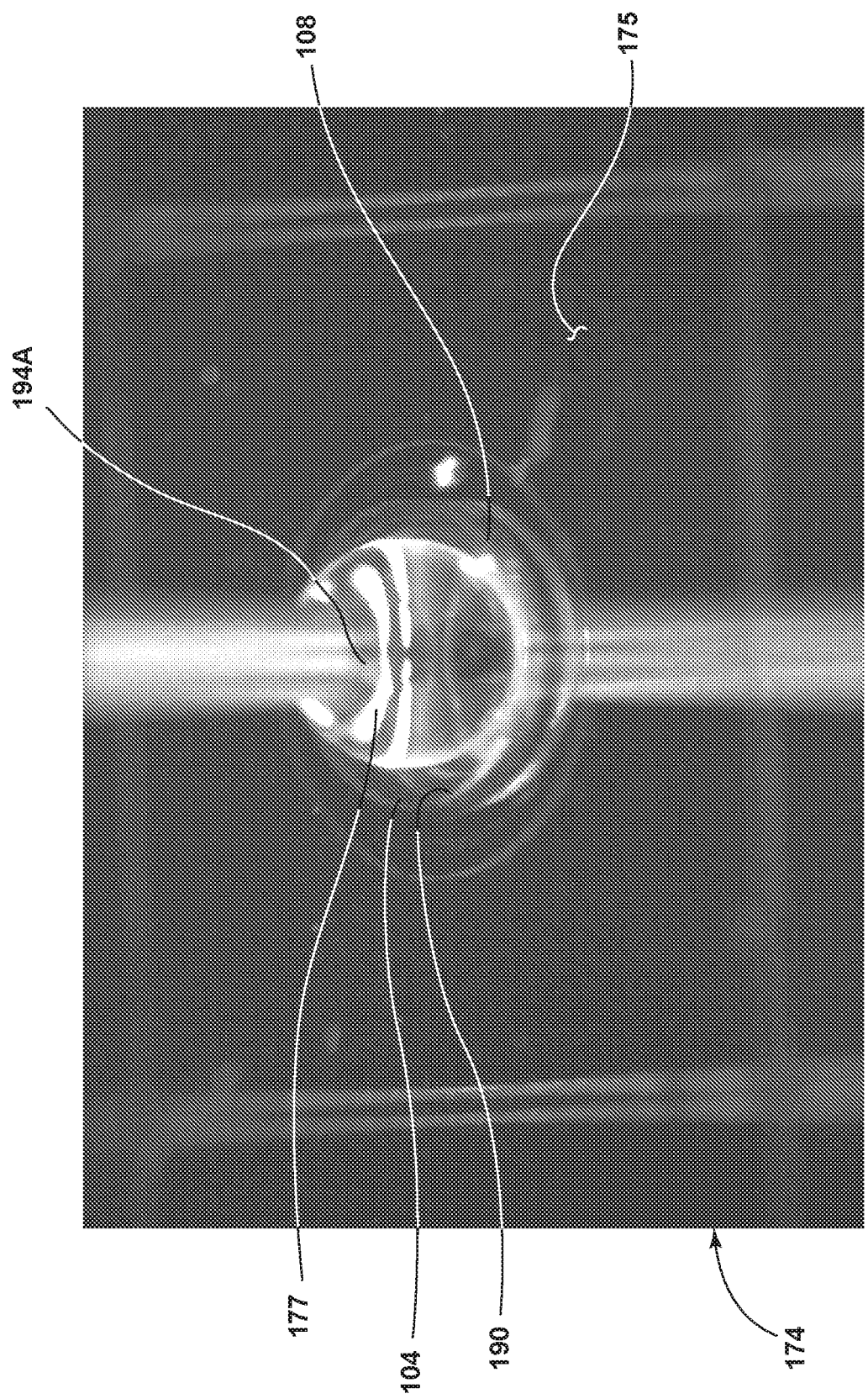
Figure 5D:
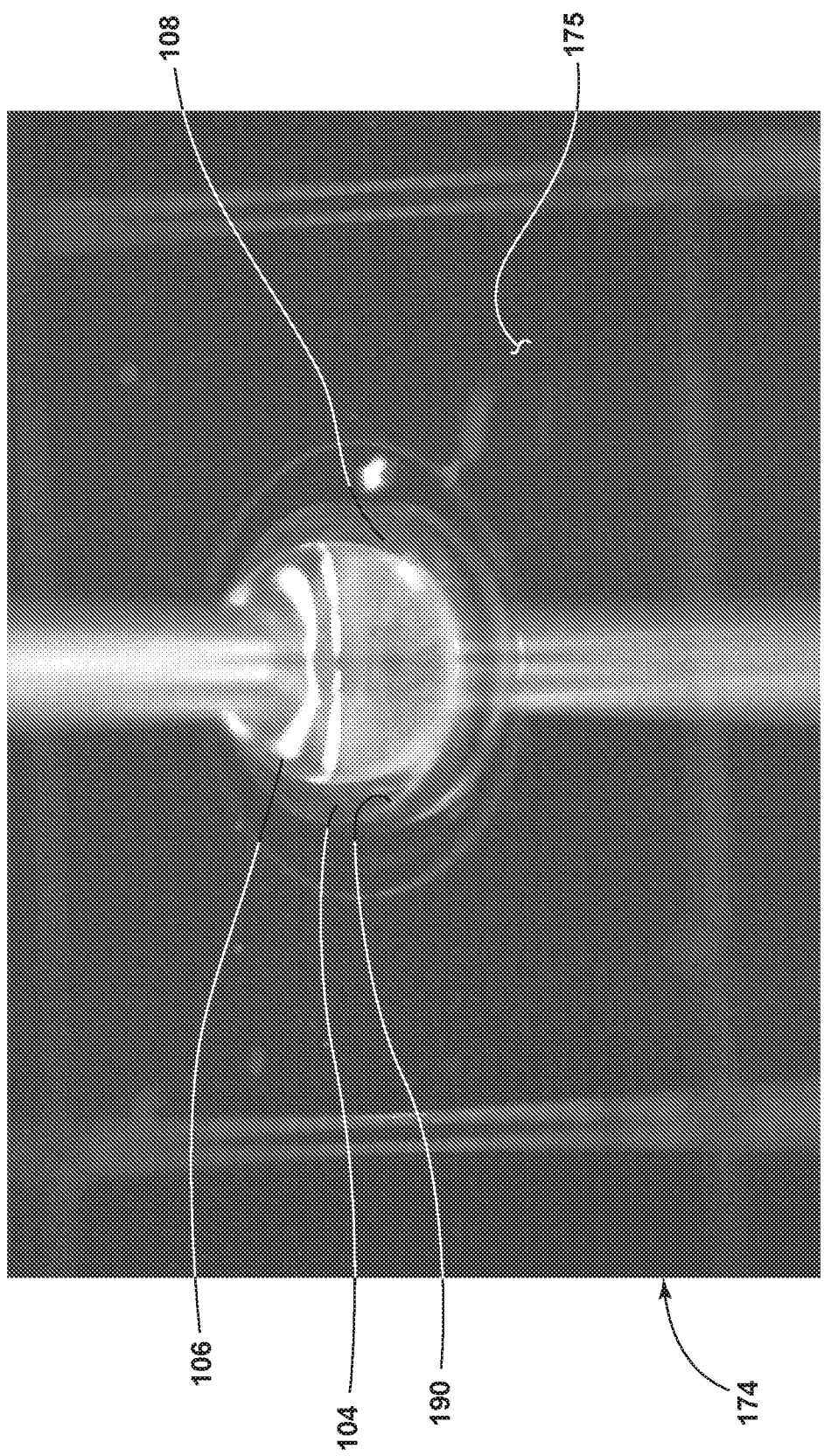
Figure 5E:
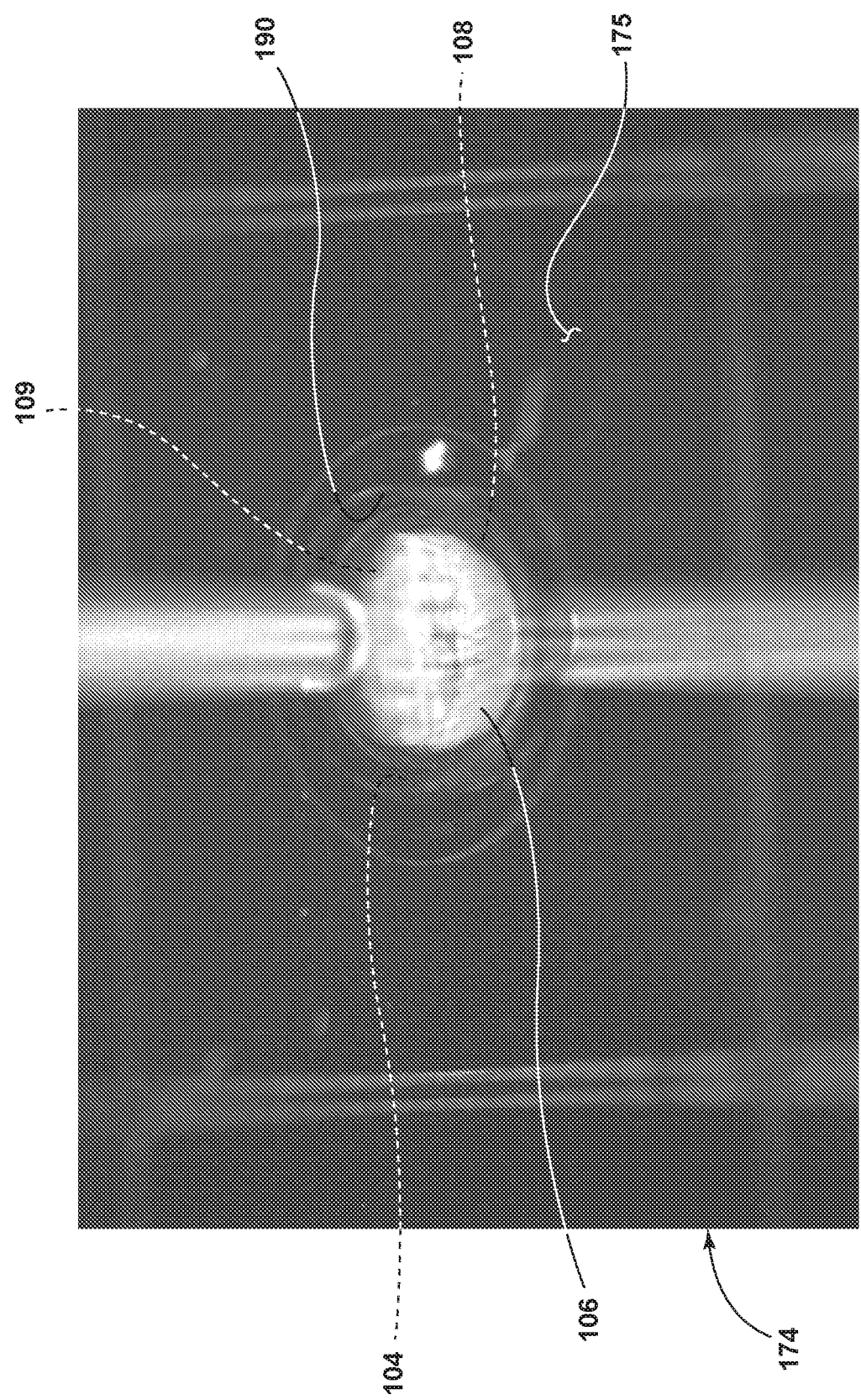
Figure 5F:
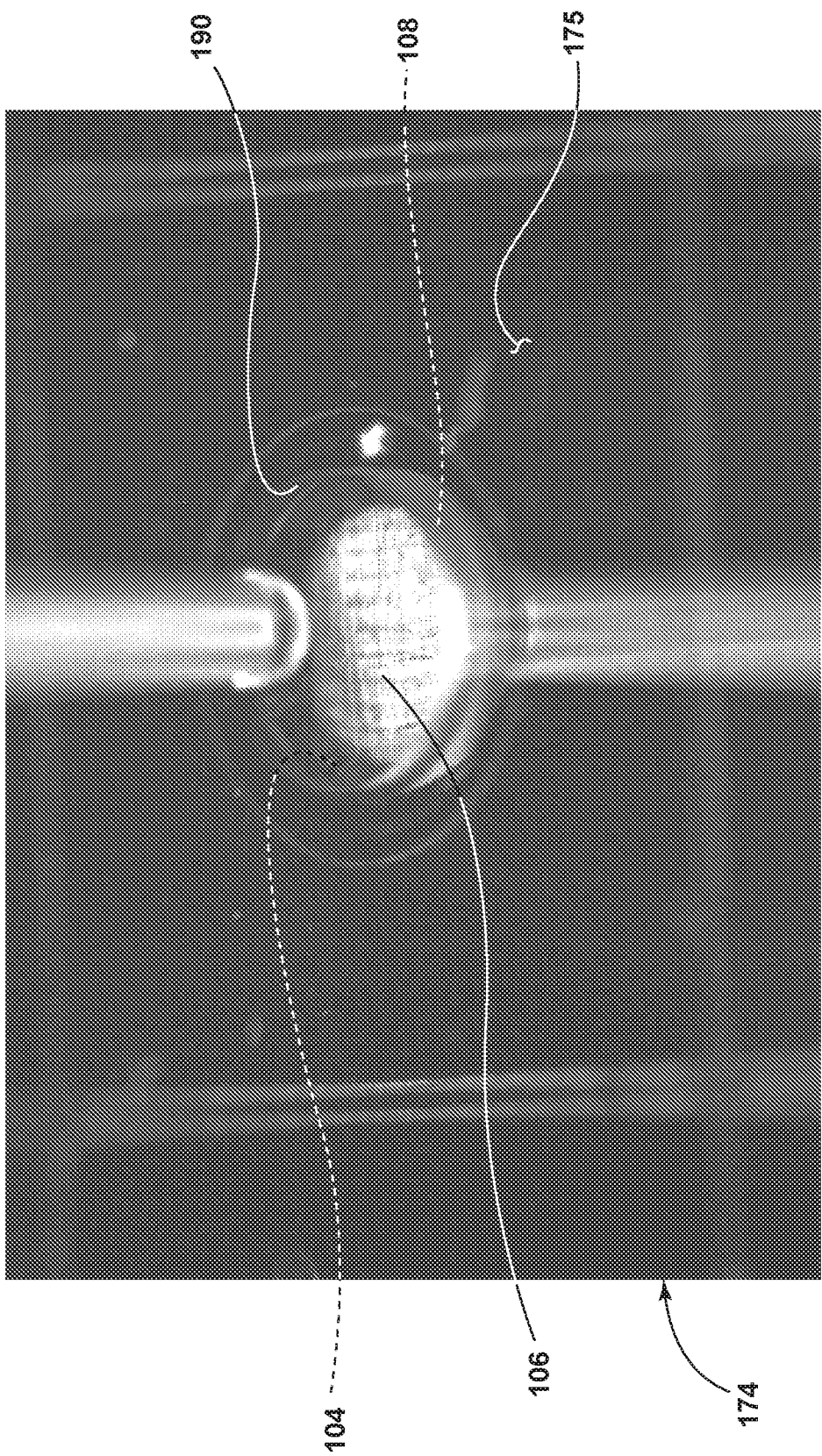

Next, a step 166 of capping the second liquid 108 with the first liquid 106 dispensed through the hole 190 is performed. As depicted in FIG. 5B, a drop 177 of a predetermined volume of the first liquid 106 begins to form at the dispensing end 194A. The picture of FIG. 5C shows the drop 177 of the predetermined volume of the first liquid 106 fully formed. The drop 177 forms a nearly perfect sphere, the circumference of the spherical drop 177 in the picture is less than the circumference of the hole 190. In other circumstances, the circumference of the drop 177 can approximate the circumference of the hole 190. The picture of FIG. 5D shows the first liquid 106 just as the drop 177 dissociates from the dispensing end 194A and deforms. Attractive forces between the first liquid 106 and the polar fluid 186 pull the first liquid 106 from the drop 177 and the polar fluid 186 together to form a contiguous cap over the second liquid 108. Repulsive forces between the second liquid 108 and both the first liquid 106 from the drop 177 and the polar fluid 186 maintain the second liquid 108 within the cavity 104 while the cap develops over the second liquid 108. In other instances, attractive forces between the surface of the hole 190 and the first liquid 106 in the drop 177 dissociate the drop 177 from the dispensing end 194A, and the first liquid 106 slides down the surface of the hole 190 until the first liquid 106 and the polar fluid 186 meet to form a contiguous cap over the second liquid 108. The picture of FIG. 5E shows the first liquid 106 capping the second liquid 108 but with an air bubble 109 within the cavity 104 forcing the first liquid 106 upward within the hole 190. The picture of FIG. 5F shows the first liquid 106 capping the second liquid 108 after the air bubble 109 escapes from the cavity 104 and the first liquid 106 is able to drop below the hole 190. Capping the second liquid 108 in this manner, before or essentially simultaneously with the first liquid 106 contacting the second liquid 108, prevents the dispensing of the first liquid 106 into the cavity 104 from displacing the second liquid 108 outside of the cavity 104. The interaction between the first liquid 106 from the drop 177 and the surface of the hole 190 and/or the polar fluid 186 prevents the drop 177 from free-falling through the hole 190 and splashing onto the second liquid 108, which would cause the second liquid 108 to exit the cavity 104.

The volume of the first liquid 106 is predetermined as a function of the total volume of the first liquid 106 and the second liquid 108 that is necessary to fill the cavity 104 of the liquid lens 100, and the desired volume ratio of the first liquid 106 to the second liquid 108. Preferably the predetermined volume of the first liquid 106 is delivered in one drop 177. Obtaining one drop 177 of the predetermined volume of the first liquid 106 that forms a spherical shape outside of the dispensing end 194A is a function of the surface tension of the first liquid 106, as well as the surface composition and the inner diameter (e.g., an opening through which the first liquid 106 passes) of the dispensing end 194A.

In some embodiments, the volume of the first liquid 106 dispensed into the cavity 104 to cap the second liquid 108 may be from about 500 nanoliters to about 3.0 microliters, or from about 600 nanoliters to about 1.5 microliters, or from about 700 nanoliters to about 1.1 microliters, or from about 800 nanoliters to about 1.0 microliter. For example, the quantity of the first liquid 106 provided to cap the second liquid 108 may be about 800 nanoliters, about 850 nanoliters, about 900 nanoliters, about 1.0 microliter, 1.1 microliters, or about 1.2 microliters, or about 1.3 microliters, or about 1.4 microliters, or about 1.5 microliters, or about 1.6 microliters, or about 1.7 microliters, or about 1.8 microliters, or about 1.9 microliters, or about 2.0 microliters, or about 2.1 microliters, or about 2.2 microliters, or about 2.3 microliters, or about 2.4 microliters, or about 2.5 microliters, or about 2.6 microliters, or about 2.7 microliters, or about 2.8 microliters, or about 2.9 microliters, or about 3.0 microliters, or any and all values and ranges therebetween.

The volume of the first liquid 106 dispensed may be such that a volumetric ratio of the second liquid 108 to the first liquid 106 in the cavity 104 may be from about 0.01 to about 0.99, or about 0.1 to about 0.9, or about 0.2 to about 0.8, or about 0.3 to about 0.7, or about 0.4 to about 0.6. For example, the volumetric ratio of the second liquid 108 to the first liquid 106 in the cavity 104 may be about 0.01, or about 0.05, or about 0.1, or about 0.15, or about 0.2, or about 0.25, or about 0.3, or about 0.35, or about 0.4, or about 0.45, or about 0.5, or about 0.55, or about 0.6, or about 0.65, or about 0.7, or about 0.75, or about 0.8, or about 0.85, or about 0.9, or about 0.95, or about 0.99, or any and all values and ranges therebetween. It will be understood that the first liquid 106 and/or the second liquid 108 may have a volumetric ratio to the total volume of the mixed first liquid 106 and the second liquid 108 of from about 0.01 to about 0.99, or about 0.1 to about 0.9, or about 0.2 to about 0.8, or about 0.3 to about 0.7, or about 0.4 to about 0.6, or any and all values and ranges therebetween.

In some embodiments, however, the dispensing end 194A of the dispenser 194 may have an internal diameter of from about 100 μm to about 300 μm, or from about 125 μm to about 275 μm, or from about 150 μm to about 250 μm, or from about 175 μm to about 225 μm. For example, the internal diameter of the dispensing end 194A of the dispenser 194 may be about 100 μm, or about 110 μm, or about 120 μm, or about 130 μm, or about 140 μm, or about 150 μm, or about 160 μm, or about 170 μm, or about 180 μm, or about 190 μm, or about 200 μm, or about 210 μm, or about 220 μm, or about 230 μm, or about 240 μm, or about 250 μm, or about 260 μm, or about 270 μm, or about 280 μm, or about 290 μm, or about 300 μm, or any and all values and ranges therebetween. In the event that the volume of the largest drop 177 that is able to form with the particular combination of the first liquid 106 and the dispensing end 194A is less than the predetermined volume, then step 166 includes dispensing more than one drop 177 into the cavity 104. In some embodiments, the first drop 177 is able to cap the second liquid 108. Subsequent drops 177 add additional volume of the first liquid 106 until the predetermined volume of the first liquid 106 within the cavity 104 has been achieved.

The dispensing end 194A of the dispenser 194 is preferably positioned such that the circumference of the drop 177 at its largest spherical extent is proximate the polar fluid 186 or the hole 190 above the polar fluid 186. Accordingly, before the drop 177 is formed, the dispensing end 194A can be positioned a predetermined distance 187 away from a plane defined by a top surface 175 of the first substrate 174 or a predetermined distance 189 away from the second liquid 108 within the cavity 104. In some embodiments, the distance 187 between the plane defined by the top surface 175 of the first substrate 174 is from about 0.1 mm to about 10 mm, or from about 0.2 mm to about 9 mm, or from about 0.3 mm to about 8 mm, or from about 0.4 mm to about 7 mm, or from about 0.5 mm to about 6 mm, or from about 0.5 mm to about 5 mm, or from about 0.5 mm to about 4 mm, or from about 0.5 mm to about 3 mm, or from about 1 mm to about 3 mm, or from about 0.5 mm to about 2 mm, or from about 0.5 mm to about 1 mm. For example, the distance 187 can be about 0.1 mm, or about 0.5 mm, or about 1 mm, or about 1.5 mm, or about 2 mm, or about 2.5 mm, or about 3 mm, or about 3.5 mm, or about 4 mm, or about 4.5 mm, or about 5 mm, or about 5.5 mm, or about 6 mm, or about 6.5 mm, or about 7 mm, or about 7.5 mm, or about 8 mm, or about 8.5 mm, or about 9 mm, or about 9.5 mm, or about 10 mm, or any and all values and ranges therebetween.

As explained above, the first liquid 106 used to cap the second liquid 108 is preferably in a single drop 177 (i.e., as shown in FIG. 3A and FIGS. 5A-5F) or in a plurality of drops 177. In single drop 177 embodiments, an entirety of the first liquid 106 dispensed from the dispensing end 194A is dispensed as a single drop 177. In embodiments where a plurality of dispensers 194 are utilized, one or more of the dispensers 194 dispense a single drop 177 or one or more of the dispensers 194 dispense a plurality of drops 177. Regardless of the number of drops 177 dispensed, the capping of the second liquid 108 by the first liquid 106 is done such that the first liquid 106 and the second liquid 108 are substantially free of mixing. Minimizing the distance between the drop 177 and the hole 190 or the second liquid 108 reduces the impact between the first liquid 106 and the second liquid 108 such that the release of the drop 177 from the dispensing end 194A does not cause the first liquid 106 and the second liquid 108 to substantially mix. For example, as mentioned, the first liquid 106 (e.g., the drop 177 of the first liquid 106) may initially contact the surface of the hole 190 and then slowly fall into the cavity 104 while in contact with surface of the hole 190, thereby limiting the velocity at which the first liquid 106 contacts the second liquid 108 disposed in the cavity 104.

According to various examples, step 166 may be performed within a short period of time after step 158. Depending on the composition of the second liquid 108, the second liquid 108 may tend to evaporate or otherwise dissipate while not capped with the first liquid 106. Step 166 of capping the second liquid 108 with the first liquid 106 may be performed within about 10 minutes, or about 9 minutes, or about 8 minutes, or about 7 minutes, or about 6 minutes, or about 5 minutes, or about 4 minutes, or about 3 minutes, or about 2 minutes, or about 1 minute, or about 45 seconds, or about 30 seconds, or about 15 seconds, or about 10 seconds, or about 9 seconds, or about 8 seconds, or about 7 seconds, or about 6 seconds, or about 5 seconds, or about 4 seconds, or about 3 seconds, or about 2 seconds, or about 1 second of the completion of step 158. Such capping may help to prevent evaporation of the second liquid 108 as the first liquid 106 fills the cavity 104.

According to various embodiments, the method 150 does not include step 162, and step 166 of capping the second liquid 108 is carried out by positioning the first liquid 106 on the first substrate 174 such that the first liquid 106 flows into the cavity 104 through the hole 190. The first liquid 106 may be positioned on the first substrate 174 in a variety of manners. For example, the first liquid 106 may be dispensed (e.g., poured) onto the first substrate 174 such that as the first liquid 106 accumulates, it flows across the first substrate 174 and through the holes 190 into the cavity 104. It will be understood that in such an example, the first liquid 106 may be dispensed in a single location on the first substrate 174 or in a plurality of locations.

Figure 3A:
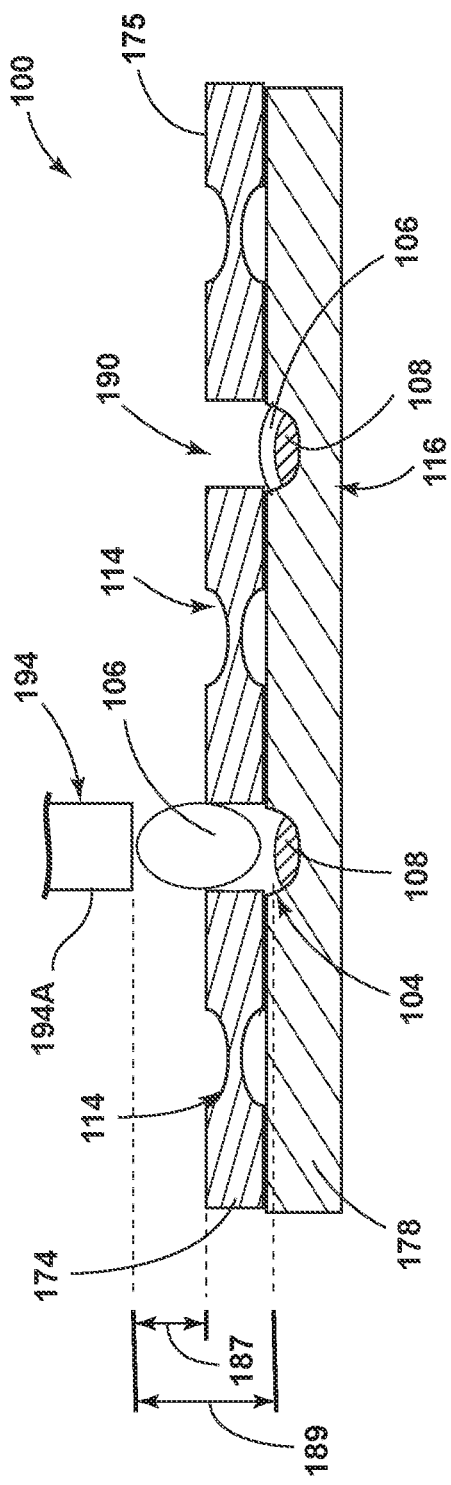
FIG. 3A is a schematic cross-section of a step of the method of FIG. 2, illustrating a second substrate including the cavity and the second liquid of the liquid lenses of FIG. 1A or 1B, a first substrate including a plurality of holes aligned with the cavity, and a dispensing end of a dispenser dispensing a single drop of the first liquid through the hole and from a short distance above the second liquid within the cavity, with a cavity aligned with a hole.
Figure 3B:
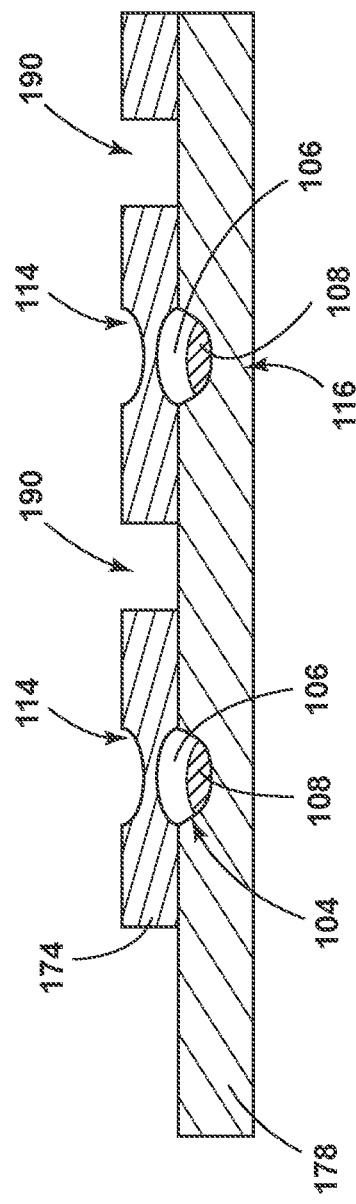
FIG. 3B is a schematic cross-section of another step of the method of FIG. 2, illustrating the first substrate having been translated relative to the second substrate, such that the cavity is closed and the first liquid and the second liquid have formed an interface.

Next, a step 170 of translating at least one of the first substrate 174 and/or the second substrate 178 such that the hole 190 is not aligned with the cavity 104 is performed (as shown in FIG. 3B). For example, the first substrate 174 may be translated (e.g., with the second substrate 178 held stationary), the second substrate 178 may be translated (e.g., with the first substrate 174 held stationary), or both the first substrate 174 and the second substrate 178 may be translated such that the hole 190 is no longer aligned with the cavity 104. As the hole 190 is no longer aligned with the cavity 104, the first liquid 106 and the second liquid 108 are held in place within the cavity 104. It will be understood that in examples of the method 150 where the first substrate 174 is a mask or mask layer as described above, the first substrate 174 may be translated relative to the second substrate 178 by removing the mask and replacing it with the first outer layer 118.

Figure 4B:
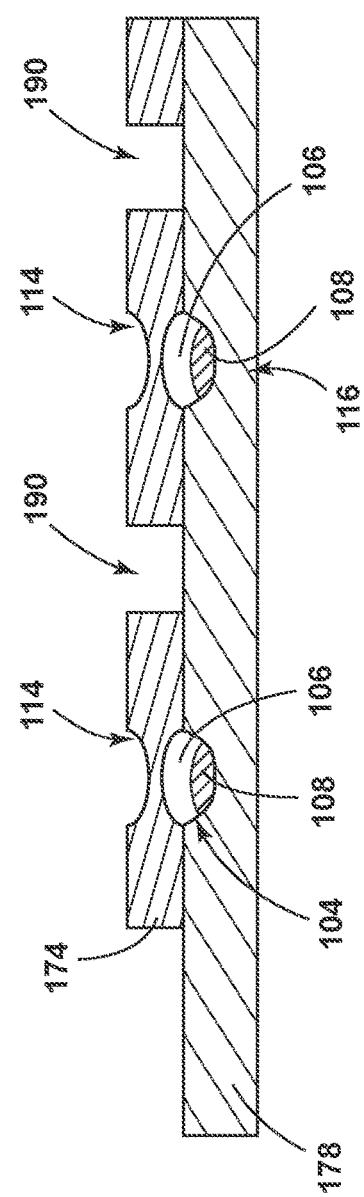
FIG. 4B is a schematic cross-section of another embodiment of another step of the method of FIG. 2, illustrating the first substrate having been translated relative to the second substrate, and the polar fluid in the gap removed, such that the cavity is closed and the first liquid and the second liquid have formed an interface.

Concurrently or subsequently with step 170, a step of collapsing the gap 182 (e.g., as shown in FIG. 4B) such that the polar fluid 186 in the gap 182 is substantially evacuated can be performed. The gap 182 may be collapsed by applying pressure to the first substrate 174 and the second substrate 178 in an inward direction such that the width of the gap 182 is decreased and the polar fluid 186 of the gap 182 is forced out. Additionally or alternatively, the polar fluid 186 may be drawn out from the gap 182 (e.g., by drying, wicking, sucking, etc.) such that the width of the gap 182 decreases until the gap 182 is supported by surface roughness of the first substrate 174 and the second substrate 178.

After completion of the method 150, a number of additional steps or actions may be taken. For example, the first substrate 174 and the second substrate 178 may be coupled (e.g., through a laser and/or adhesive bonding process), and in examples where a plurality of cavities 104 exist on a single wafer (e.g., a combination of the first substrate 174 and the second substrate 178), the wafer may be diced or singulated to form a plurality of liquid lenses 100.

It will be understood that although the method 150 was described as including a number of steps in a particular order, it will be understood that the method 150 may add or omit one or more steps, that steps may be performed out of the described order, or that one or more steps may be performed substantially simultaneously without departing from the teachings provided herein.

Referring now to FIG. 4A, provided is a schematic depiction of the structures used in the method 150. As explained above, the first substrate 174 (which may correspond to the first outer layer 118 of FIGS. 1A and 1B) is positioned over the second substrate 178 (e.g., corresponding to the intermediate layer 120, the second outer layer 122, and/or a combination of the intermediate layer 120 and the second outer layer 122 of FIGS. 1A and 1B). The gap 182 is filled with the polar fluid 186. The first substrate 174 defines one or more holes 190. As shown, the holes 190 are aligned with the cavities 104 defined above the second substrate 178. Further, the first substrate 174 may be thinned or have a reduction in thickness proximate the first windows 114. Such a feature may be advantageous in allowing the first substrate 174 to flex under force from the expansion or contraction of the first liquid 106 and the second liquid 108. As explained above, the first liquid 106 is provided to the cavity 104 by the dispenser 194 having the dispensing end 194A. The first liquid 106 is dispensed as one or a plurality of drops 177 through the holes 190 of the first substrate 174 and into the cavity 104.

Referring now to FIG. 4B, the gap 182 between the first substrate 174 and the second substrate 178 has been collapsed such that the polar fluid 186 has been removed. Further, the first substrate 174 and the second substrate 178 have been translated relative to one another such that the holes 190 are no longer aligned with the cavities 104, but the first windows 114 and the second windows 116 are aligned. Translation of the first substrate 174 and/or the second substrate 178 may allow the first substrate 174 and the second substrate 178 to retain the first liquid 106 and the second liquid 108 within the cavity 104.

Use of the presently disclosed method 150 and the liquid lens 100 may have a variety of advantages.

First, use of the single and multiple drop 177 embodiments of step 166 provide a soft, low energy, method to cap the second liquid 108 with the first liquid 106. Using low energy methods of capping may be advantageous in preventing disturbance of the previously dispensed second liquid 108, preventing splashing of the first liquid 106 and/or the second liquid 108 from the cavity 104, and preventing mixing of the first liquid 106 and the second liquid 108.

Second, use of the dispenser 194 and the control of the location of the dispensing end 194A may be advantageous in controlling the capping drop 177 shape, volume, and release as well as other conditions which may affect the relative placement of the first liquid 106 and the second liquid 108.

Third, as capping of the second liquid 108 with the first liquid 106 is performed within a short period of time after the positioning of the second liquid 108 within the cavity 104, production costs may be reduced. As mentioned, prolonged exposure of the second liquid 108 to the environment may result in evaporation of one or more constituents of the second liquid 108. Accordingly, by decreasing the amount of time the second liquid 108 is left uncapped, less constituents may evaporate and less of the second liquid 108 may be lost.

Fourth, use of the dispenser 194 may prevent the unintentional filling of the cavities 104. For example, conventional techniques may inadvertently fill multiple cavities 104 with the first liquid 106 which may disturb the second liquid 108 or provide a non-uniform amount of the first liquid 106. By utilizing the dispenser 194, the individual cavities 104 may be filled with a consistent amount of the first liquid 106 on demand.

Fifth, use of the dispenser 194 and the method 150 may allow for a high volume process of capping the second liquid 108 by lower capital equipment cost while producing higher process throughput and yield over conventional liquid lens 100 manufacturing processes.

EXAMPLES

Example 1—A second substrate 178 was prepared with twelve (12) cavities 104 patterned therein. Each cavity 104 was conical with a 2.5 mm diameter at the narrow end 105A. The cavities 104 were separated, center-to-center (i.e., optical axis 112 to optical axis 112), by a distance of 8 mm. The second substrate 178 had a thickness of 0.591 mm. A 1.4 µm thick insulating outer layer 132A of parylene C was applied to each cavity 104, making that portion of the cavity 104 hydrophobic.

A first substrate 174 of a mask having a thickness of 0.637 mm and twelve (12) holes 190, each having a diameter of 1.6 mm, was prepared. The mask first substrate 174 was placed on the second substrate 178 with the center of each hole 190 being aligned with the center (i.e., the optical axis 112) of the cavity 104 below the hole 190. A gap 182 was defined between the mask first substrate 174 and the second substrate 178 using a spacer having a thickness of 50 µm. A polar fluid 186 having a composition of 50 wt % ethylene glycol mix with 46.75 wt % water, 3 wt % sodium Bromide, and 0.25 wt % pentanol was dispensed within the gap 182. The polar fluid 186 did not enter the cavities 104, because the insulating outer layer 132A of parylene C applied to each cavity 104 repelled the polar fluid 186.

A Lee solenoid valve INKX0517500A VHS-M/M-FCR-24V with a 0.008" (~203 µm) bore needle was utilized to dispense a volume of 850 nanoliters of a second liquid 108 into each cavity 104. The second liquid 108 was a mixture of phenyltrimethylgermane, phenyltris(trimethoxysiloxy)silane, and butylated hydroxyltoluene. A Nordson EFD syringe barrel with adapter was charged with 50 milliliters of a first liquid 106, which was the same as the polar fluid 186. The Nordson EFD syringe barrel was in fluid communication with a Corsolution pressure and flow sensor pump to function as a dispenser 194 and dispense a controlled volume of the first liquid 106 through the 0.008" (~203 µm) bore needle at the dispensing end 194A. The dispensing end 194A of the dispenser 194 was robotically centered above the center of each hole 190 of the mask first substrate 174, and approximately 1 mm above the plane defined by the top surface 175 of the first substrate 174. The dispenser 194 then dispensed, through the dispensing end 194A, a single large drop 177 of 5-8 microliters of the first liquid 106 onto the second liquid 108 within each of the cavities 104. The drop 177 was approximately 100-200 µm above the top surface 175 upon disassociation from the dispensing end 194A. The dispensed volume of the first liquid 106 capped the second liquid 108 without displacing the second liquid 108 out of the cavity 104. The dispensing of the first liquid 106 into all twelve (12) cavities 104 of the second substrate 178 took a time period of approximately 20 seconds.

Example 2—A second substrate 178 was prepared with twelve (12) cavities 104 patterned therein. Each cavity 104 was conical with a 2.5 mm diameter at the narrow end 105A. The cavities 104 were separated, center-to-center (i.e., optical axis 112 to optical axis 112), by a distance of 8 mm. The second substrate 178 had a thickness of 0.591 mm. A 1.4 µm thick insulating outer layer 132A of parylene C was applied to each cavity 104, making that portion of the cavity 104 hydrophobic.

A first substrate 174 of a mask having a thickness of 0.647 mm and twelve (12) holes 190 each having a diameter of 1.6 mm, was prepared. The mask first substrate 174 was placed on the second substrate 178 with the center of each hole 190 aligned with the center (i.e., the optical axis 112) of the cavity 104 below the hole 190. A gap 182 was defined between the mask first substrate 174 and the second substrate 178 using a spacer having a thickness of 50 µm. A polar fluid 186 having a composition of 50 wt % ethylene glycol mix with 46.75 wt % water, 3 wt % sodium Bromide, and 0.25 wt % pentanol was dispensed within the gap 182. The polar fluid 186 did not enter the cavities 104, because the insulating outer layer 132A of parylene C applied to each cavity 104 repelled the polar fluid 186.

A 2 microliter pipette was utilized to dispense a volume of 850 nanoliters of a second liquid 108 into each cavity 104. The second liquid 108 was a mixture of phenyltrimethylgermane, phenyltris(trimethoxysiloxy)silane, and butylated hydroxyltoluene. A syringe pump was charged with 50 milliliters of a first liquid 106, which was the same as the polar fluid 186. The syringe pump functioned as a dispenser 194 to dispense a controlled volume of the first liquid 106 with a 0.008" (~203 µm) bore needle as the dispensing end 194A. The dispensing end 194A of the dispenser 194 was robotically centered above the center of each hole 190 of the mask first substrate 174, and approximately 1 mm above the plane defined by the top surface 175 of the first substrate 174. The dispenser 194 then dispensed, through the dispensing end 194A, a single large drop 177 of 5-8 microliters of the first liquid 106 onto the second liquid 108 within each of the cavities 104. The drop 177 was approximately 100-200 µm above the top surface 175 upon disassociation from the dispensing end 194A. The dispensed volume of the first liquid 106 capped the second liquid 108 and did not displace the second liquid 108 out of the cavity 104. The dispensing of the first liquid 106 into all twelve (12) cavities 104 of the second substrate 178 took a time period of approximately 30 seconds.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A method of forming a liquid lens, comprising the steps of:
positioning a first substrate defining a hole over a second substrate, wherein a cavity is defined within the second substrate and aligned with the hole;
dispensing a second liquid into the cavity defined within the second substrate;
capping the second liquid with a first liquid dispensed through the hole, wherein the first liquid and the second liquid have different refractive indices than each other; and
translating at least one of the first substrate or the second substrate such that the hole is not aligned with the cavity.

2. The method of claim 1, wherein the first substrate is a mask layer.

3. The method of claim 1, wherein the first substrate defines a first window and the second substrate defines a second window.

4. The method of claim 1, wherein the first liquid comprises a polar liquid and the second liquid comprises a non-polar liquid.

5. The method of claim 1, wherein:
the first substrate comprises a first outer layer; and
the second substrate comprises an intermediate layer and a second outer layer bonded to the intermediate layer, a bore through the intermediate layer defining the cavity.

6. The method of claim 1,
wherein, the cavity includes an insulating element that is hydrophobic, and after the second liquid is dispensed within the cavity, the second liquid contacts the insulating element.

7. The method of claim 1, wherein, capping the second liquid with a first liquid dispensed through the hole comprises dispensing the entirety of the first liquid that caps the second liquid in a single drop from a dispensing end of a dispenser.

8. The method of claim 1, wherein, the first liquid dispensed contacts a surface of the first substrate defining the hole before contacting the second liquid.

9. A method of forming a liquid lens, comprising the steps of:
positioning a first substrate defining a hole over a second substrate, wherein a cavity is defined above the second substrate and aligned with the hole;
dispensing a second liquid into the cavity defined above the second substrate;
positioning a dispenser having a dispensing end over the second liquid;
capping the second liquid with a first liquid dispensed through the hole, wherein the first liquid that caps the second liquid is dispensed in one drop from the dispensing end, and the first liquid and the second liquid have different refractive indices than each other; and
translating at least one of the first substrate or the second substrate such that the hole is not aligned with the cavity.

10. The method of claim 9, wherein the dispensing end of the dispenser has an internal diameter of from about 150 μm to about 250 μm.

11. The method of claim 9, wherein the drop forms a sphere having a circumference that is less than a circumference of the hole.

12. The method of claim 9, wherein a central axis of the dispensing end aligns with a central axis of the second liquid.

13. The method of claim 9, wherein the drop dissociates from the dispensing end and contacts a surface of the first substrate that defines the hole before contacting the second liquid.

14. The method of claim 9, wherein:
the second substrate comprises a plurality of cavities each holding the second liquid;
the first substrate comprises a plurality of holes, each disposed over one of the plurality of cavities;
a plurality of dispensers each comprising a dispensing end are positioned over the second liquid in each of the plurality of cavities; and
the first liquid is simultaneously dispensed from each of the plurality of dispensers.

15. The method of claim 9, wherein after the drop of the first liquid caps the second liquid, a subsequent drop of the first liquid is dispensed to add additional volume of the first liquid until a predetermined volume of the first liquid within the cavity has been achieved.

16. A method of forming a liquid lens, comprising the steps of:
positioning a first substrate defining a hole over a second substrate, wherein a cavity is defined within the second substrate and aligned with the hole, a gap extends between the first substrate and the second substrate, and a polar fluid is disposed in the gap between the first substrate and the second substrate;
dispensing a second liquid into the cavity defined above the second substrate;
capping the second liquid with a first liquid dispensed through the hole, wherein the first liquid and the second liquid have different refractive indices than each other; and
translating at least one of the first substrate or the second substrate such that the hole is not aligned with the cavity.

17. The method of claim 16, wherein the polar fluid and the first liquid have substantially the same composition.

18. The method of claim 16, wherein the first liquid that caps the second liquid is dispensed in one drop.

19. The method of claim 16, wherein the first liquid that is dispensed meets the polar fluid and forms a contiguous cap with the polar fluid over the second liquid.

20. The method of claim 16, further comprising the step:
collapsing the gap such that the polar fluid in the gap is substantially evacuated.

* * * * *